US012175768B2

(12) United States Patent  
Horiuchi et al.

(10) Patent No.: US 12,175,768 B2  
(45) Date of Patent: Dec. 24, 2024

(54) CONTROL APPARATUS, MOVING OBJECT, CONTROL METHOD, AND COMPUTER-READABLE STORAGE MEDIUM

(71) Applicant: HONDA MOTOR CO., LTD., Tokyo (JP)

(72) Inventors: Moriya Horiuchi, Saitama (JP); Shigeru Inoue, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 306 days.

(21) Appl. No.: 17/831,393

(22) Filed: Jun. 2, 2022

(65) Prior Publication Data

US 2022/0392231 A1 Dec. 8, 2022

(30) Foreign Application Priority Data

Jun. 8, 2021 (JP) ................................. 2021-095848

(51) Int. Cl.
*G06V 20/58* (2022.01)
*G06T 7/70* (2017.01)
(Continued)

(52) U.S. Cl.
CPC ................ *G06V 20/58* (2022.01); *G06T 7/70* (2017.01); *G06V 10/22* (2022.01); *G06T 2207/30261* (2013.01); *G08G 1/16* (2013.01)

(58) Field of Classification Search
CPC .......... G06V 20/58; G06V 10/22; G06T 7/70; G06T 2207/30261; G08G 1/16
See application file for complete search history.

(56) References Cited

U.S. PATENT DOCUMENTS

2007/0030212 A1\* 2/2007 Shibata ..................... G06T 5/50  
                                                                              345/9  
2009/0237269 A1\* 9/2009 Okugi ..................... G08G 1/166  
                                                                           340/901

(Continued)

FOREIGN PATENT DOCUMENTS

CN        107554430 A     1/2018  
CN        110520916 A    11/2019

(Continued)

OTHER PUBLICATIONS

Office Action issued for counterpart Japanese Application No. 2021-095848, issued by the Japanese Patent Office on Jan. 24, 2023 (drafted on Jan. 16, 2023).

(Continued)

*Primary Examiner* — Dale W Hilgendorf  
*Assistant Examiner* — Hana Lee

(57) ABSTRACT

There is provided a control apparatus that includes at least one processor to: identify an unrecognizable area not possible to be recognized from a moving object; calculate an arrival time taken by the moving object to arrive at a location in the unrecognizable area; set a first region and a second region in the unrecognizable area based on the arrival time; set an alerting level for the first region and an alerting level for the second region different from each other; control transmitting warning information to an external apparatus; and control the moving object based on response information received from the external apparatus in response to the warning information. The warning information includes location information of the first region and location information of the second region; and information indicating the alerting level set for the first region and the alerting level set for the second region.

20 Claims, 7 Drawing Sheets

(51) Int. Cl.
*G06V 10/22* (2022.01)
*G08G 1/16* (2006.01)

(56) References Cited

U.S. PATENT DOCUMENTS

| | | | |
|---|---|---|---|
| 2009/0243822 A1* | 10/2009 | Hinninger | B60Q 9/008 |
| | | | 340/435 |
| 2019/0088011 A1 | 3/2019 | Liu | |
| 2020/0210461 A1 | 7/2020 | Zhang | |
| 2020/0331470 A1* | 10/2020 | Nanri | G08G 1/167 |
| 2022/0187090 A1* | 6/2022 | Yang | G01S 17/86 |
| 2023/0410459 A1* | 12/2023 | Ikoma | G06V 10/44 |

FOREIGN PATENT DOCUMENTS

| | | |
|---|---|---|
| CN | 110544390 A | 12/2019 |
| CN | 112428953 A | 3/2021 |
| CN | 112477854 A | 3/2021 |
| JP | 2006213197 A | 8/2006 |
| JP | 2008299676 A | 12/2008 |
| JP | 2009253731 A | 10/2009 |
| JP | 2018133072 A | 8/2018 |
| JP | 2020095380 A | 6/2020 |
| JP | 2020109655 A | 7/2020 |

OTHER PUBLICATIONS

Office Action issued for counterpart Japanese Application No. 2021-095848, issued by the Japanese Patent Office on May 23, 2023 (drafted on May 10, 2023).

Office Action issued for counterpart Chinese Application 202210473496.9, issued by The State Intellectual Property Office of People's Republic of China on Jun. 1, 2023.

* cited by examiner

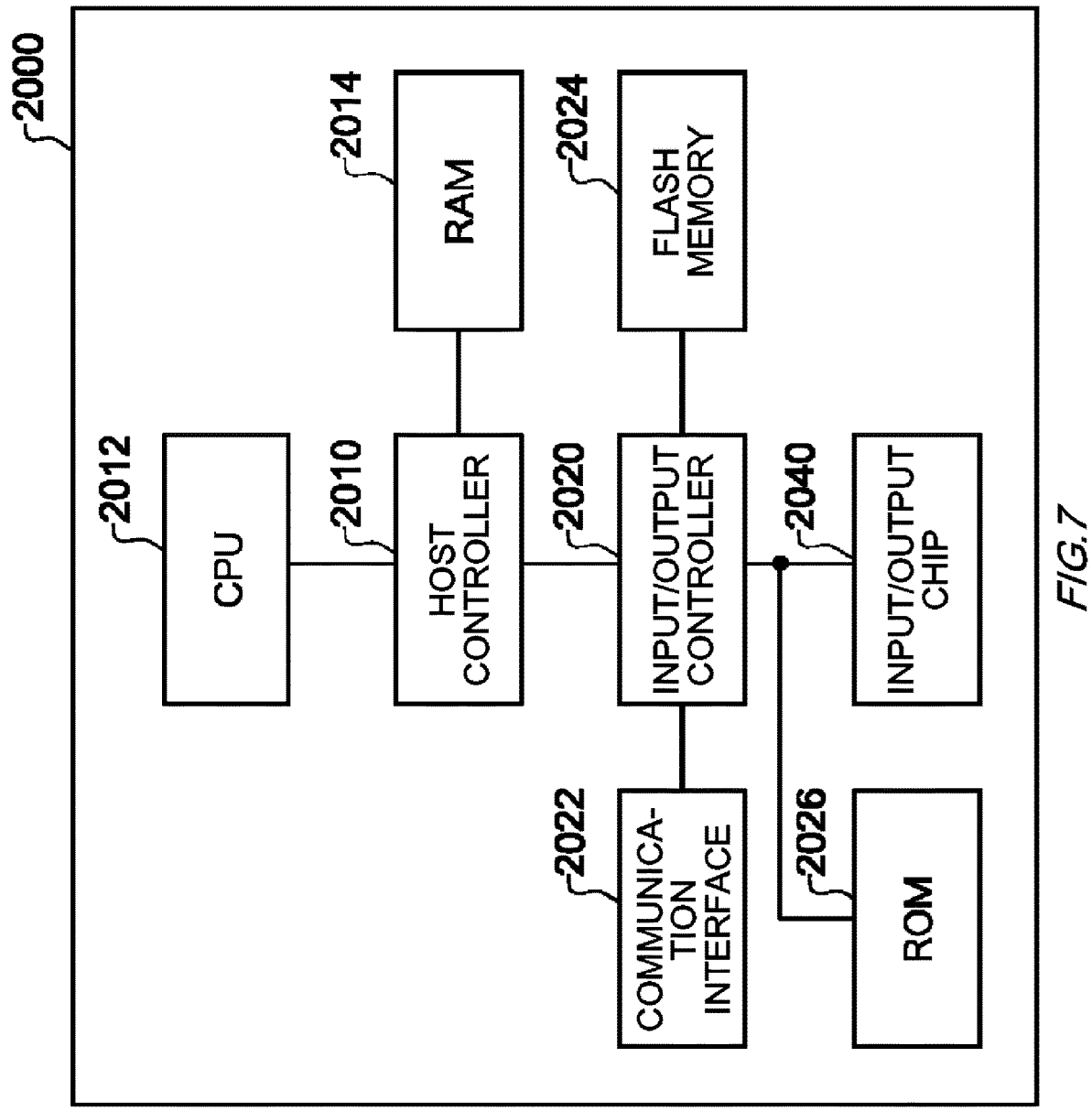

CONTROL APPARATUS, MOVING OBJECT, CONTROL METHOD, AND COMPUTER-READABLE STORAGE MEDIUM

The contents of the following Japanese patent application(s) are incorporated herein by reference:
NO. 2021-095848 filed on Jun. 8, 2021.

BACKGROUND

1. Technical Field

The present invention relates to a control apparatus, moving object, a control method, and a computer-readable storage medium.

2. Related Art

Patent document 1 describes a method of risk early warning for providing a risk early warning instruction to transportation means in response to a risk level, which indicates the possibility of an object risking the driving safety of the transportation means, exceeding a threshold level.

PRIOR ART DOCUMENT

Patent Document 1: Japanese Patent Application Publication No. 2020-109655

BRIEF DESCRIPTION OF THE DRAWINGS

FIG. 6 shows a flow chart related to a control method executed by the control apparatus 24a in the vehicle 20a.

FIG. 7 shows an example of a computer 2000.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments necessarily have to be essential to solving means of the invention.

Figure 1:
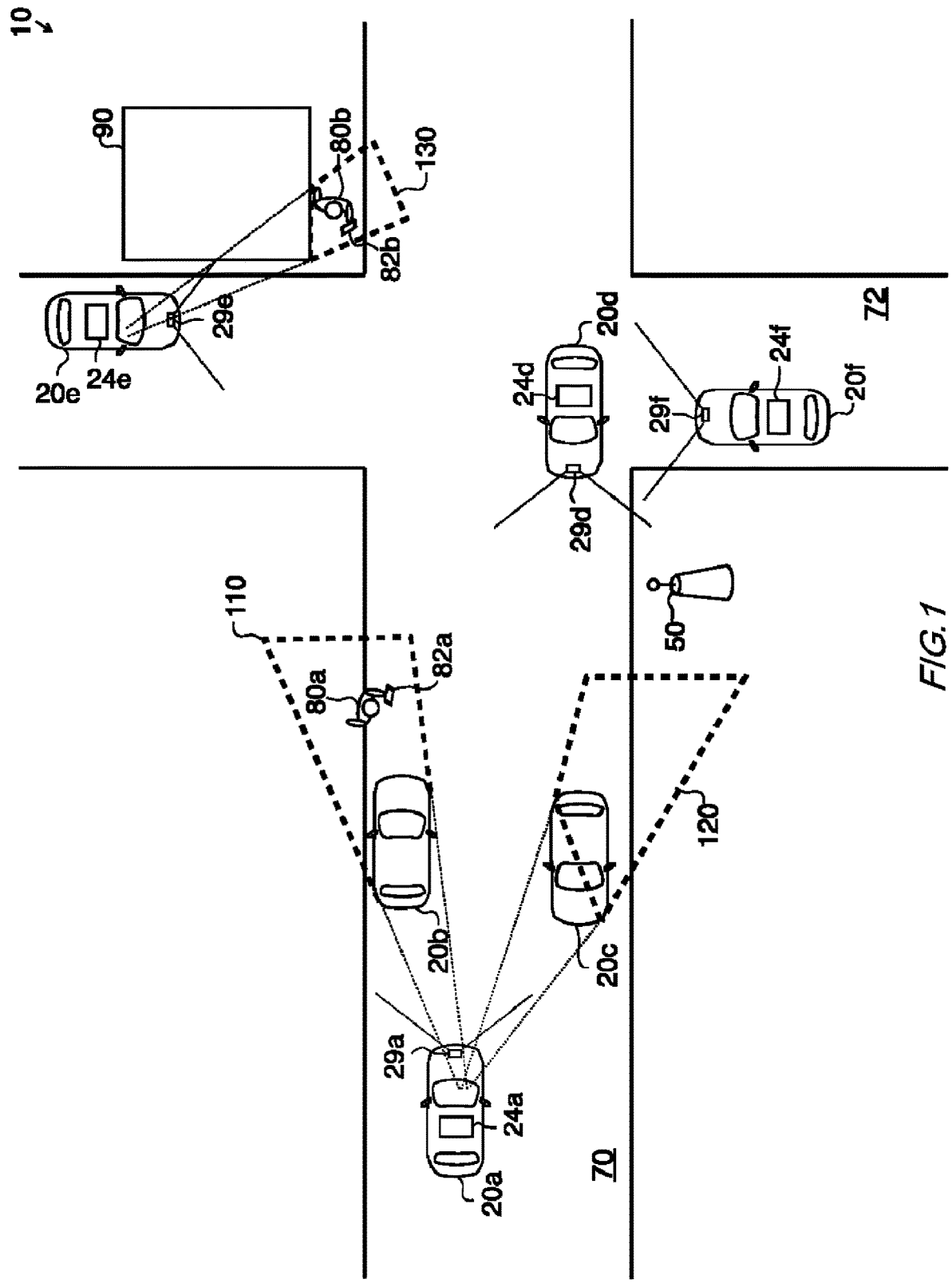
FIG. 1 schematically shows the usage scene of an alerting system 10.

FIG. 1 schematically shows the usage scene of an alerting system 10. The alerting system 10 includes: a vehicle 20a, a vehicle 20b, a vehicle 20c, a vehicle 20d, a vehicle 20e and a vehicle 20f; and a terminal 82a and a terminal 82b.

In the present embodiment, the vehicle 20a, the vehicle 20b, the vehicle 20c, the vehicle 20d, the vehicle 20e, and the vehicle 20f may be collectively referred to as "vehicle 20". The vehicle 20 is one example of a moving object. Also, the terminal 82a and the terminal 82b are terminals possessed by a pedestrian 80a and a pedestrian 80b respectively.

In the present embodiment, the pedestrian 80a and the pedestrian 80b may be collectively referred to as "pedestrian 80". Also, the terminal 82a and the terminal 82b may be collectively referred to as "terminal 82".

The vehicle 20a includes a sensor 29a and a control apparatus 24a. The sensor 29a is configured to include a camera. The control apparatus 24a has the function of processing and communicating the information acquired by the sensor 29a. Note that in the present embodiment, each vehicle 20 includes components (e.g. the sensor 29 and the control apparatus 24), and the end of the reference numeral of each vehicle 20 (such as "a", "e", "f") is added to the end of the reference numeral of the respective components so that components included in a vehicle 20 are distinguished from components included in a different vehicle 20, and which one of the vehicle 20 each component is provided for is specified.

In FIG. 1, the vehicle 20a is a vehicle driving along a roadway 70. The vehicle 20b is a vehicle parking on the roadway 70. For the vehicle 20a, an area 110, which is on a farther side than the vehicle 20b being parked in the heading direction of the vehicle 20a, is an area difficult to be perceived from the location of the vehicle 20a. In addition, the vehicle 20c is a vehicle driving along the opposite lane of the roadway 70 when seen from the vehicle 20a. An area 120, which is on a farther side than the vehicle 20c in the heading direction of the vehicle 20a, is an area difficult to be perceived from the location of the vehicle 20a. Accordingly, the control apparatus 24a detects the area 110 and the area 120, unobstructed views of which cannot be provided when seen from the vehicle 20a, as unrecognizable areas based on an image of an area in the heading direction acquired by the sensor 29a. The control apparatus 24a transmits warning information including location information of the area 110 and the area 120 through wireless communication.

In FIG. 1, the vehicle 20d is an oncoming vehicle for the vehicle 20a, and the area 110 and the area 120 can be perceived from the location where the vehicle 20d is driving. A control apparatus 24d of the vehicle 20d determines, in response to the reception of the warning information transmitted from the vehicle 20a, whether there exists a pedestrian in each of the area 110 and the area 120 based on an image acquired by a sensor 29d. When the control apparatus 24d detects that there exists a pedestrian 80a in the area 110 based on the image acquired by the sensor 29d, the control apparatus 24d transmits response information indicating that there exists a pedestrian in the area 110 to the vehicle 20a through wireless communication. In addition, when the control apparatus 24d detects that there exists no pedestrian in the area 120 based on the image acquired by the sensor 29d, the control apparatus 24d transmits response information indicating that there exists no pedestrian in the area 120 to the vehicle 20a through wireless communication.

When the terminal 82a receives the warning information transmitted from the vehicle 20a, the terminal 82a determines whether the current location of the terminal 82a is in the area 110. When the terminal 82a determines that the current location of the terminal 82a is in the area 110, the terminal 82a transmits response information indicating that the terminal 82a exists in the area 110 to the vehicle 20a through wireless communication. In addition, the terminal 82a outputs alerting information to the pedestrian 80a.

In the vehicle 20a, if the control apparatus 24a has received response information indicating that there exists a pedestrian in the area 110 from the vehicle 20d, the control apparatus 24a displays an alert. In addition, when the control apparatus 24a receives the response information from the terminal 82*a*, the control apparatus 24*a* displays an alert to the occupant of the vehicle 20*a*.

Note that in FIG. 1, for example, an area 130 is difficult to be perceived from the location of the vehicle 20*e* driving on a roadway 72 because a building 90 obstructs the view. Thus, the control apparatus 24*e* of the vehicle 20*e* transmits warning information including the location information of the area 130 through wireless communication.

In FIG. 1, the vehicle 20*f* is an oncoming vehicle for the vehicle 20*e* and is stopping at a location from which the area 130 can be perceived. When a control apparatus 24*f* of the vehicle 20*f* receives the warning information transmitted from the vehicle 20*e*, the control apparatus 24*f* determines whether there exists a pedestrian in the area 130 based on an image acquired by a sensor 29*f*. When the control apparatus 24*f* detects that there exists a pedestrian 80*b* in the area 130 based on the image acquired by the sensor 29*f*, the control apparatus 24*f* transmits response information indicating there exists a pedestrian in the area 130 to the vehicle 20*e* through wireless communication. In addition, when the terminal 82*b* receives the warning information, the terminal 82*b* determines whether the current location of the terminal 82*b* is in the area 130, and when the terminal 82*b* determines that the current location is in the area 130, the terminal 82*b* transmits response information indicating that the terminal 82*b* exists in the area 130 to the vehicle 20*e* through wireless communication. In addition, the terminal 82*b* outputs alerting information to the pedestrian 80*b*.

In the vehicle 20*e*, if the control apparatus 24*e* has received the response information indicating that there exists a pedestrian in the area 130 from the vehicle 20*f*, the control apparatus 24*e* displays an alert. In addition, when the control apparatus 24*e* receives the response information from the terminal 82*b*, the control apparatus 24*e* displays an alert to the occupant of the vehicle 20*e*.

In this way, the control apparatus 24 is configured to transmit warning information including location information of an unrecognizable area being a blind spot from the own vehicle including the control apparatus to another vehicle through wireless communication. When the another vehicle receives warning information, the another vehicle is configured to determine whether there exists a pedestrian in said unrecognizable area and transmit response information indicating that there exists a pedestrian in said unrecognizable area through wireless communication. In addition, the terminal 82 is configured to transmit response information through wireless communication when the own terminal exists in said unrecognizable area. When the control apparatus 24 receives the response information from the terminal 82 of the pedestrian or from the another vehicle, the control apparatus 24 is configured to display an alert to the occupant of the vehicle 20. Thus, an unrecognizable area not possible to be recognized by the vehicle 20 or the pedestrian 80 can be appropriately notified. The unrecognizable area can be considered as recognition of the state of the external environment recognized by the vehicle 20 or the control apparatus 24. For example, the unrecognizable area can be considered as an area involving a risk for the pedestrian 80 or the vehicle 20. For example, the unrecognizable area can be considered as an area that requires the pedestrian 80 or the vehicle 20 to perform a safety check.

Note that the communication between the control apparatus 24 and the terminal 82 and the communication between the control apparatus 24 and the control apparatus 24 of the another vehicle 20 are executed through direct communication. For example, the control apparatus 24 performs direct communication with the terminal 82 and the control apparatus 24 of the another vehicle 20 through short-distance direct communication in Cellular-V2X. The short-distance direct communication in Cellular-V2X includes a communication system such as LTE-V2X PC5 or 5G-V2X PC5 (abbreviated as "PC5" in the present embodiment). A form using Wi-Fi (registered trademark) or dedicated short range communications (DSRC) may be employed as direct communication. The control apparatus 24 may perform direct communication via a base station 50. In addition to Cellular-V2X or DSRC (registered trademark), any direct communication system such as Bluetooth (registered trademark) may be employed as direct communication. The control apparatus 24 may perform direct communication with the terminal 82 and the control apparatus 24 of the another vehicle 20 by using communication infrastructure provided for intelligent transport systems (ITS).

Note that in the present embodiment, for providing a clear description, a case where whether there exists a pedestrian in an unrecognizable area is determined is presented. The pedestrian refers to a person who can pass through a roadway in a method not using a vehicle. The pedestrian includes a person who passes through a roadway by using a wheelchair or the like. However, whether there exists any moving object other than the pedestrian, such as a person not being a pedestrian and another vehicle, in the unrecognizable area may be determined as well. The person not being a pedestrian may include a person who is in a stopping vehicle.

Figure 2:
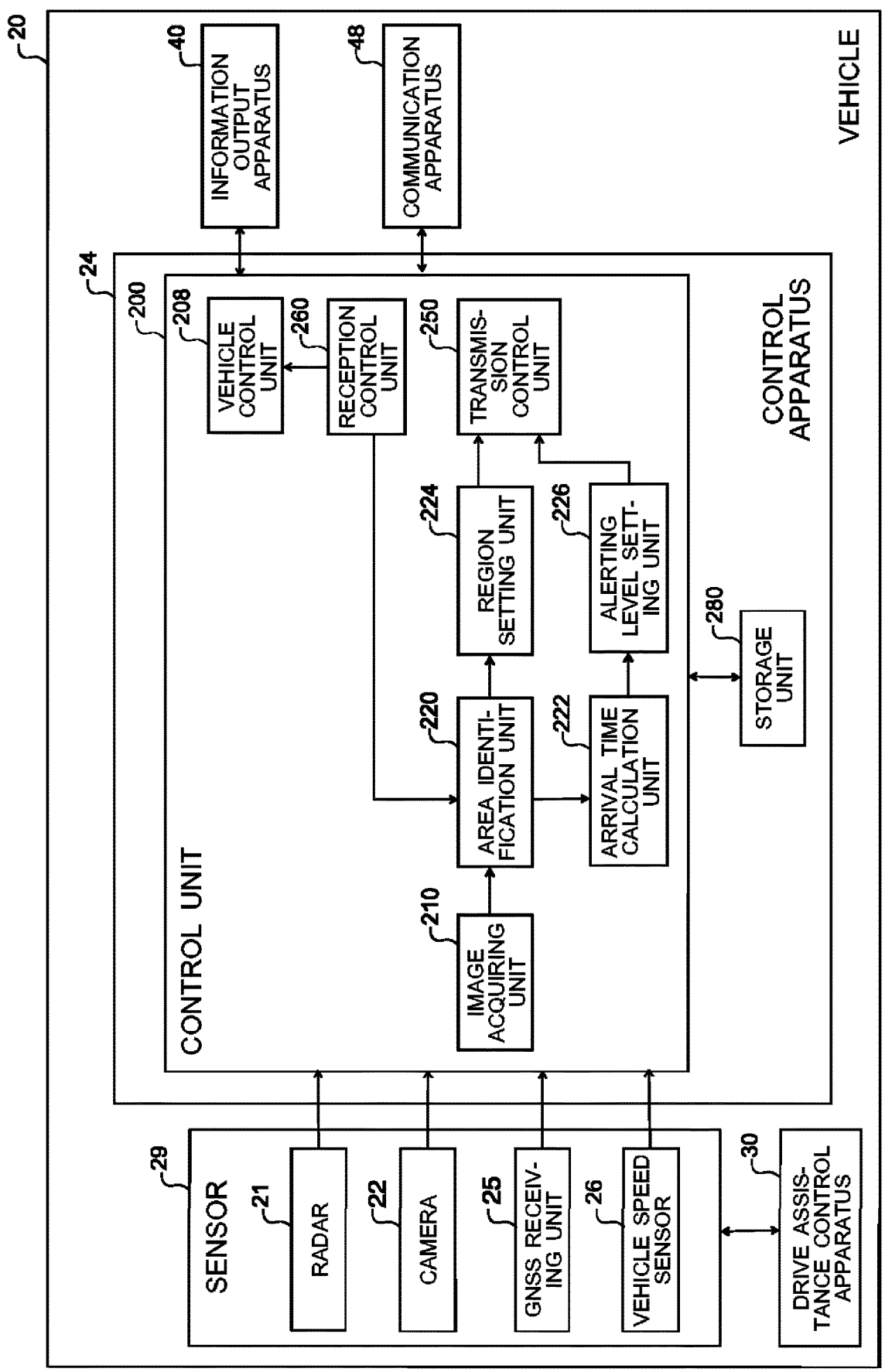
FIG. 2 shows a system configuration of a vehicle 20.

FIG. 2 shows a system configuration of a vehicle 20. The vehicle 20 includes a sensor 29, a drive assistance control apparatus 30, a control apparatus 24, a communication apparatus 48, an information output apparatus 40.

The sensor 29 includes a radar 21, a camera 22, a GNSS receiving unit 25, and a vehicle speed sensor 26. The radar 21 may be LiDAR, a millimeter-wave radar, or the like. The GNSS receiving unit 25 is configured to receive radio waves transmitted from a GNSS satellite. The GNSS receiving unit 25 is configured to produce information indicating the current location of the vehicle 20 based on a signal received from the GNSS satellite. The camera 22 is one example of an image capturing unit mounted on the vehicle 20. The camera 22 is configured to capture an image of an area around the vehicle 20 to produce image information. For example, the camera 22 captures an image of an area in the heading direction of the vehicle 20 to produce image information. The camera 22 may be a monocular camera. The camera 22 may be a compound eye camera, which can acquire distance information on the distance to an object. Note that the sensor 29 may include a location sensor, such as an Odometer, and an inertial measurement unit (IMU), such as an acceleration sensor or a posture sensor.

The drive assistance control apparatus 30 is configured to perform driving assistance of the vehicle 20 by using information detected by the sensor 29. The drive assistance control apparatus 30 may be implemented by an ECU having functions of advanced driver-assistance systems (ADAS).

The communication apparatus 48 is responsible for direct communication with a terminal 82 and with another vehicle 20. For example, the communication apparatus 48 is responsible for wireless communication by the PC5.

The control apparatus 24 includes a control unit 200 and a storage unit 280. The control unit 200 is implemented, for example, by a circuit such as an arithmetic processing device or the like including a processor. The storage unit 280 may be implemented with a non-volatile storage medium included. The control unit 200 performs processing by using information stored in the storage unit 280. The control unit 200 may be implemented by an electronic control unit (ECU) including a microcomputer including a CPU, a ROM, a RAM, an I/O, a bus, and the like.

The control unit 200 includes an image acquiring unit 210, an area identification unit 220, an arrival time calculation unit 222, a region setting unit 224, an alerting level setting unit 226, a vehicle control unit 208, a transmission control unit 250, and a reception control unit 260. Note that a form of the control unit 200 not having functions of some of the functional blocks shown in FIG. 2 may be employed. For example, a form may be employed, in which only the function of the region setting unit 224 is implemented as the function of the control unit 200, and the other functions, such as the functions of the image acquiring unit 210, the area identification unit 220, and the arrival time calculation unit 222, are implemented as the functions of another circuit such as the sensor 29.

The image acquiring unit 210 is configured to acquire image information on an image of the outside of the vehicle 20. The image acquiring unit 210 acquires the image from the camera 22 installed in the vehicle 20.

The area identification unit 220 is configured to identify an unrecognizable area not possible to be recognized from the vehicle 20. For example, the area identification unit 220 identifies an unrecognizable area based on the image acquired by the image acquiring unit 210. The unrecognizable area is, for example, an area out of sight when seen from the location of the vehicle 20. The area out of sight is, for example, an area where an occlusion has occurred because the area is screened by a three-dimensional object, such as a building or another stopping vehicle 20, when seen from the location of the vehicle 20. The area identification unit 220 may identify an area out of sight based on image information and map information. The area identification unit 220 may receive location information of an area out of sight transmitted from an external apparatus such as another vehicle 20 or the base station 50 to identify an area out of sight based on the received location information of the area out of sight.

The arrival time calculation unit 222 is configured to calculate an arrival time taken by the vehicle 20 to arrive at a location in the unrecognizable area identified by the area identification unit 220. The region setting unit 224 is configured to set a first region and a second region in the unrecognizable area identified by the identification unit based on the arrival time. The alerting level setting unit 226 is configured to set an alerting level for the first region and an alerting level for the second region which are different from each other. The transmission control unit 250 is configured to control the transmission of warning information including: the location information of the first region and the location information of the second region; and information indicating the alerting levels for the first region and the second region set by the alerting level setting unit 226.

The region setting unit 224 may set the first region and the second region when the unrecognizable area identified by the area identification unit 220 exceeds a predetermined size. The alerting level setting unit 226 may set a uniform alerting level for the unrecognizable area if the region setting unit 224 has not set the first region and the second region.

The alerting level setting unit 226 may set the alerting level for the first region and the alerting level for the second region different from each other, based on an arrival time taken by the vehicle 20 to arrive at the first region and an arrival time taken by the vehicle 20 to arrive at the second region. The alerting level setting unit 226 may set the alerting level for the first region higher than the alerting level for the second region if the arrival time taken by the vehicle 20 to arrive at the first region is shorter than the arrival time taken by the vehicle 20 to arrive at the second region.

The transmission control unit 250 may control the transmission of the warning information without designating the destination. The transmission control unit 250 may control the transmission of the warning information by a broadcast.

The reception control unit 260 may control the reception of the location information of the unrecognizable area from an external apparatus. The reception control unit 260 is one example of a location information reception control unit. The area identification unit 220 may identify an area not possible to be recognized from the location of the vehicle 20 based on the location information received from the external apparatus. The external apparatus may be another vehicle 20 passing through the vicinity of the vehicle 20 or a server that collects location information of an unrecognizable area. The server that collects location information of the unrecognizable area may be an MEC server connected to the base station 50. The MEC server may hold location information of the unrecognizable area transmitted from a plurality of vehicles passing through the vicinity and transmit the held location information of the unrecognizable area to a vehicle 20 passing through the vicinity.

The reception control unit 260 is configured to control the reception of response information to the warning information, from an external apparatus. The reception control unit 260 is one example of a response reception control unit. The vehicle control unit 208 may control the vehicle 20 based on the response information from the external apparatus. The vehicle control unit 208 may control execution of driving assistance of the vehicle 20 or warning to the occupant of the vehicle 20.

By way of one example, the vehicle control unit 208 may control the driving of the vehicle 20 by controlling the drive assistance control apparatus 30. If the information output apparatus 40 includes a head-up display, when the vehicle control unit 208 receives response information indicating that there exists a pedestrian in the first region or the second region, the vehicle control unit 208 may cause the head-up display of the vehicle 20a to output light for forming a mark as warning information to the occupant. In addition, the vehicle control unit 208 causes the head-up display to output light for forming a mark in a display region corresponding to the region where the pedestrian exists. The vehicle control unit 208 may project light for forming a mark onto a reflective member provided for a windshield of the vehicle 20. Note that the vehicle control unit 208 may perform warning by sounds or characters.

The reception control unit 260 may control the reception of response information indicating that there exists a warning target in at least one of the first region or the second region. The reception control unit 260 may control the reception of the response information from another vehicle 20 existing outside the unrecognizable area. The reception control unit 260 may control the reception of the response information from another moving object existing in the unrecognizable area. The another moving object existing in the unrecognizable area may be the terminal 82, for example.

Note that the location information of the first region may include the coordinate information of the first region. The location information of the second region may include the coordinate information of the second region. The coordinate information may include a plurality of pieces of coordinate information indicating the range of the unrecognizable area.

The coordinate information may be coordinate information indicating the geographic location. For example, if the first region is a polygon, the coordinate information of the first region may be the coordinate information of the vertexes of the polygon. The location information of the first region may include coordinate information and distance information from the location indicated by said coordinate information. The location information of the second region may include coordinate information and distance information from the location indicated by said coordinate information. For example, coordinate information of a specific point in the first region and distance information indicating the size of the first region with respect to said point may be included.

Note that the information output apparatus 40 is configured to output alerting information. The information output apparatus 40 may have a Human Machine Interface (HMI) function. The information output apparatus 40 may include a head-up display or a navigation system. The information output apparatus 40 may be a mobile terminal possessed by an occupant of the vehicle 20. The information output apparatus 40 may be a sound outputting apparatus configured to output alerting information by sounds.

Figure 3:
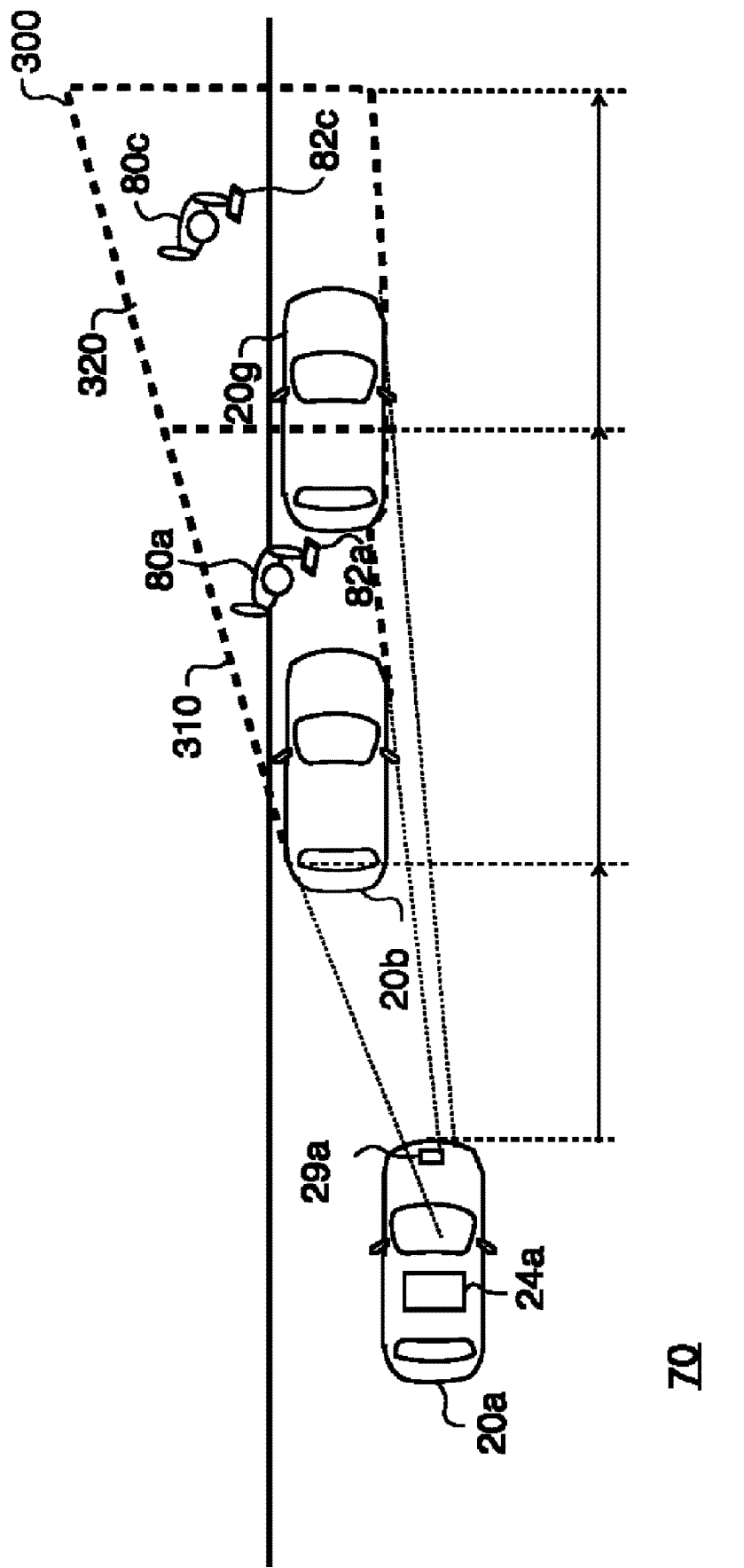
FIG. 3 is for describing the situation in which an unrecognizable area is partitioned into a plurality of regions, and warning levels are set.

FIG. 3 is for describing the situation in which an unrecognizable area is partitioned into a plurality of regions, and warning levels are set. In the situation shown in FIG. 3, which is different from the situation shown in FIG. 1, the vehicle 20b and a vehicle 20g are parallel-parked, and thus the area 300 being an unrecognizable area from the location of the vehicle 20a is longer, along the heading direction of the vehicle 20a, than the area 110.

In this case, the region setting unit 224 partitions the area 300 into a first region 310 and a second region 320 in a direction along the heading direction of the vehicle 20a. The first region 310 is an area located closer to the vehicle 20a than the second region 320. The alerting level setting unit 226 sets the first warning level for the first region 310 higher than the second warning level for the second region 320.

When the terminal 82a receives warning information, according to the first warning level set for the first region 310 where the terminal 82a exists, the terminal 82a performs warning at a warning level higher than the level of the second warning level. Meanwhile, when a terminal 82c receives warning information, according to the second warning level set for the second region 320 where the terminal 82c exists, the terminal 82c performs warning at a warning level lower than the level of the first warning level. For example, the terminal 82a warns the pedestrian 80a by vibrations and sounds, and the terminal 82c warns a pedestrian 80c only by vibrations.

Figure 4:
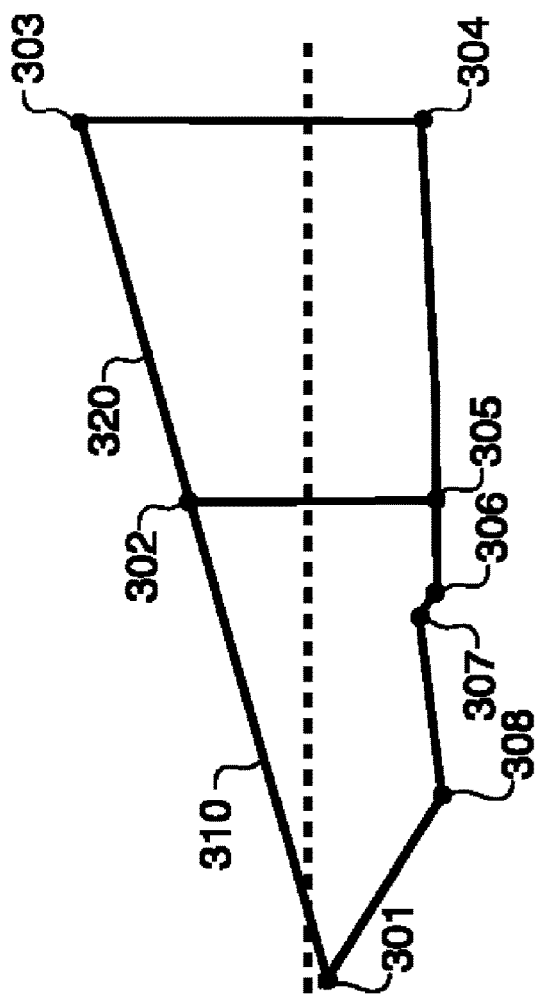
FIG. 4 conceptually shows the location information of the first region and the second region included in the warning information.

FIG. 4 conceptually shows the location information of the first region and the second region included in the warning information.

The area identification unit 220 calculates the coordinates of each of six points: a point 301; a point 302; a point 305; a point 306; a point 307; and a point 308, indicating the contour of the first region 310. The first region 310 is a closed region formed by linking the coordinates of the point 301, the point 302, the point 305, the point 306, the point 307, and the point 308. In addition, the area identification unit 220 calculates the coordinates of each of four points: a point 302; the point 303; a point 304; and the point 305, indicating the contour of the second region 320. The second region 320 is a closed region formed by linking the point 302, the point 303, the point 304, and the point 305.

The area identification unit 220 stores, in the storage unit 280, each of the coordinates of the point 301, the point 302, the point 305, the point 306, the point 307, and the point 308 in association with the region ID given to the first region 310. In addition, the area identification unit 220 stores, in the storage unit 280, each of the coordinates of the point 302, the point 303, the point 304, and the point 305 in association with the region ID given to the second region 320. Then, the transmission control unit 250 transmits warning information including: the region IDs; the plurality of coordinates indicating the first region 310, the region ID and the first warning level; and the plurality of coordinates indicating the second region 320, the region ID and the second warning level.

When the vehicle 20d receives the warning information, the control apparatus 24d analyzes, for each of the first region and the second region, an image region that includes the area enclosed by the coordinates indicating each region, from images acquired by a camera mounted on the vehicle 20d, so as to detect a pedestrian in said area. The control apparatus 24d produces response information in which the result of detecting the pedestrian in the first region 310 is associated with the region ID of the first region 310 and the result of detecting the pedestrian in the second region 320 is associated with the region ID of the second region 320, and transmits the produced response information to the vehicle 20a being the sender of the warning information.

In addition, if the terminal 82 has received warning information, the terminal 82 determines, based on the coordinates of each of the first region and the second region included in the warning information, whether the current location of the terminal 82 is included in the region enclosed by the coordinates indicating each of the regions. If the current location of the terminal 82 is included in one of the first region and the second region, the terminal 82 transmits response information including an area ID associated with the coordinates of the region where the terminal 82a exists to the vehicle 20a being the sender of the warning information.

Note that when the first region is a polygon, the location information of the first region may include coordinate information of a point being a reference of the polygon and information on the side length such as the width and height of the unrecognizable area. When the first region is in an oval shape, the location information of the first region may include coordinate information of the center point of the first region and information on the major diameter, the minor diameter, and the azimuth.

Figure 5:
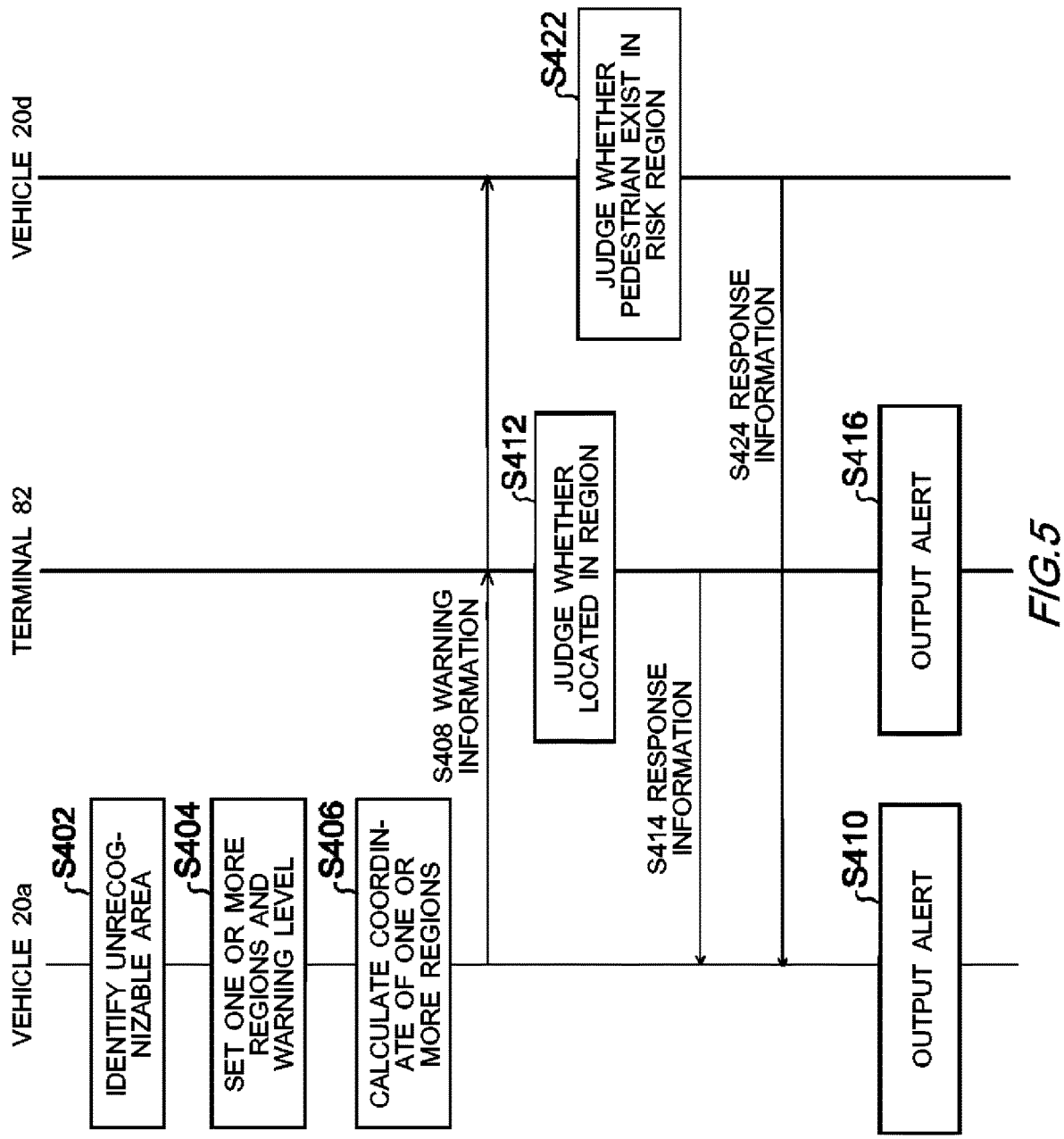
FIG. 5 schematically shows a flow of processing executed by the vehicle 20a, the terminal 82, and the vehicle 20d.

FIG. 5 schematically shows a flow of processing executed by the vehicle 20a, the terminal 82, and the vehicle 20d. FIG. 5 shows the flow of the processing in a case where the vehicle 20a directly communicates with the terminal 82 and the vehicle 20d by the PC5 or the like.

In S402, the area identification unit 220 recognizes an unrecognizable area in the heading direction of the vehicle 20a from the image acquired from the sensor 29a. In S404, the region setting unit 224 sets one or more regions for the unrecognizable area recognized in S402, and the alerting level setting unit 226 sets a warning level for the one or more regions. As described above, the region setting unit 224 may partition the unrecognizable area into the first region 310, which is closer to the vehicle 20a, and the second region 320, which is farther from the vehicle 20a, and the alerting level setting unit 226 may set the warning level for the first region 310 higher than the warning level for the second region 320.

In S406, the area identification unit 220 calculates coordinate information of the one or more regions selected in S404. For example, the area identification unit 220 may calculate absolute coordinate information of each of the first region 310 and the second region 320 based on the coordinate information of the current location of the vehicle 20a, and the relative coordinates of the first region 310 in relation with the vehicle 20a and the relative coordinates of the second region 320 in relation with the vehicle 20a. The absolute coordinate information of the first region 310 and the second region 320 may be geographic coordinates. The absolute coordinate information of the first region 310 and the second region 320 may include latitude information and longitude information of the coordinates of each of the first region 310 and the second region 320.

In S408, the transmission control unit 250 transmits warning information. The warning information may include region ID, coordinate information of the one or more regions set in S404, the warning level for the one or more regions, and sender information of the warning information. The region ID is identification information for uniquely identifying the one or more regions set in S404. The region ID may identification information determined by the control apparatus 24a. The sender information is identification information for uniquely identifying the vehicle 20a being the sender of warning information.

In S412, when the terminal 82a receives the warning information transmitted from the vehicle 20a, the terminal 82a judges whether the terminal 82a is located in one or more regions indicated by coordinates notified by the warning information. For example, the terminal 82a determines whether the coordinates of the current location of the terminal 82a is in a region defined by the coordinate information of the one or more regions included in the warning information. If the terminal 82a is located in said region, the terminal 82a transmits response information indicating that there exists a pedestrian in the region to the vehicle 20a in S414. When transmitting the response information, the terminal 82a includes, in the response information, the region ID included in the warning information having received by the terminal 82a and the terminal ID for uniquely identifying the terminal 82a. In addition, in S416, the terminal 82a alerts the pedestrian 80a in accordance with the alerting level, by the Human Machine Interface (HMI) function of the terminal 82a. Note that if the terminal 82a has determined that the terminal 82a is not located in the one or more regions in S412, the terminal 82a discards the received warning information, does not transmit response information, and does not provide an alert.

In S422, when the control apparatus 24d of the vehicle 20d receives the warning information transmitted from the vehicle 20a, the control apparatus 24d of the vehicle 20d judges whether there exists a pedestrian in the region defined by the coordinate information of the one or more regions included in the warning information. For example, the control apparatus 24d determines whether there exists a pedestrian in the region defined by said coordinate information based on the image and the distance information acquired by the sensor 29d. In S424, the control apparatus 24d transmits response information including the result of determining whether there exists a pedestrian to the vehicle 20a. When transmitting the response information, the control apparatus 24d includes, in the response information, the area ID included in the received warning information, the terminal ID for uniquely identifying the vehicle 20d, and existence information indicating whether there exists a pedestrian in the region.

In S410, if the control apparatus 24a has received the response information transmitted from the terminal 82a, the control apparatus 24a uses the HMI function of the information output apparatus 40 to output alerting information. In addition, if the existence information indicating that there exists a pedestrian in the region is included in the response information received from the vehicle 20d, the control apparatus 24a uses the HMI function of the information output apparatus 40 to output an alert to the occupant of the vehicle 20a in accordance with the alerting level of the region where the pedestrian exists.

Figure 6:
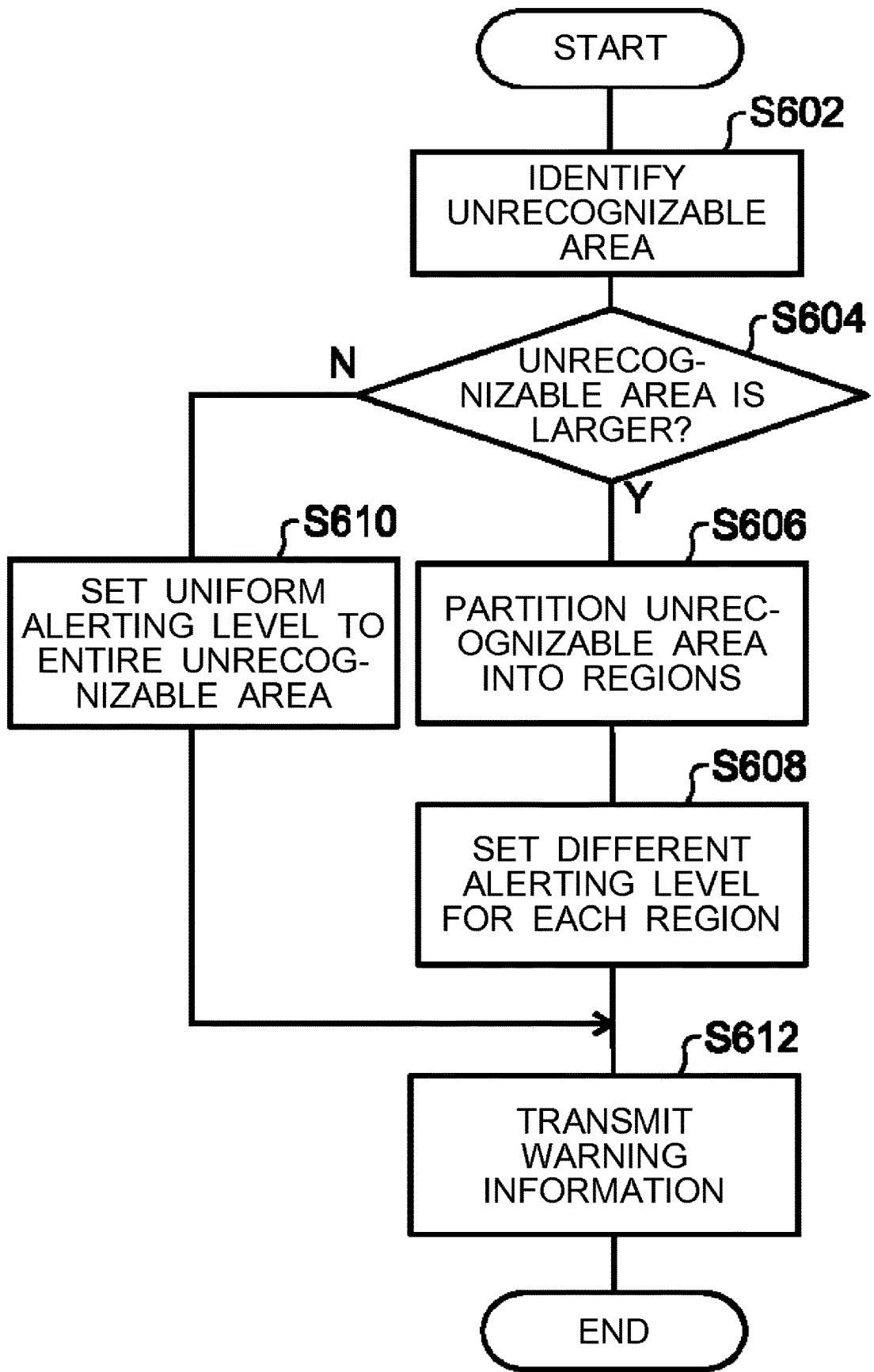

FIG. 6 shows a flow chart related to a control method executed by the control apparatus 24a in the vehicle 20a. The processing in this flowchart starts if an unrecognizable area has been detected.

In S602, the area identification unit 220 identifies the unrecognizable area. For example, the area identification unit 220 identifies an area out of sight based on image information on the image captured by the camera 22, map information, and/or information received from another vehicle or the base station 50.

In S604, the region setting unit 224 determines whether the unrecognizable area is larger than a predetermined size. For example, the region setting unit 224 determines whether the length of the unrecognizable area in the direction along the heading direction of the vehicle 20a is longer than a predetermined length. The region setting unit 224 may determine whether the length of the unrecognizable area in the direction orthogonal to the heading direction of the vehicle 20a is longer than a predetermined length.

If it is determined that the unrecognizable area is larger than the predetermined size in S604, the region setting unit 224 partitions the unrecognizable area into a plurality of regions in S606. For example, if the length of the unrecognizable area in the direction along the heading direction of the vehicle 20a is longer than the predetermined length, the unrecognizable area is partitioned into the plurality of regions in the direction along the heading direction of the vehicle 20a. If the region setting unit 224 has determined that the length of the unrecognizable area in the direction orthogonal to the heading direction of the vehicle 20a is longer than a predetermined length, the region setting unit 224 may partition the unrecognizable area into a plurality of region in the direction orthogonal to the heading direction of the vehicle 20a.

In S608, the alerting level setting unit 226 sets different alerting levels for each of the plurality of regions resulting from the partitioning in S606. For example, the alerting level setting unit 226 sets different alerting levels for each of the plurality of regions resulting from the partitioning in S606 in accordance with the distance from the current location of the vehicle 20a. In addition, the alerting level setting unit 226 may set different alerting levels for each of the plurality of regions resulting from the partitioning in S606 in accordance with the arrival time taken by the vehicle 20a to arrive at each of the plurality of regions from the current location. The alerting level setting unit 226 may calculate the arrival time based on the current speed of the vehicle 20a and the distance from the current location to each of the plurality of regions. In S612, the transmission control unit 250 transmits warning information including the coordinate information of the plurality of regions resulting from partitioning in S606 and the alerting level set for each region in S608, and then the processing in this flowchart ends.

If the region setting unit 224 has determined that the unrecognizable area is smaller than or equal to the predetermined size in S604, the region setting unit 224 sets a uniform alerting level to the entire unrecognizable area without partitioning the unrecognizable area in S610. In S612, the transmission control unit 250 transmits warning information including coordinate information of the entire unrecognizable area and the set uniform alerting level, and the processing in this flowchart ends.

Note that as a transmission system of the warning information, a system to directly transmit warning information to the terminal 82 or another vehicle 20 by the PC5 or the like as described above can be employed, and a system to transmit warning information via the base station 50 or a MEC server connected to the base station 50 can also be employed. For example, when the base station 50 receives warning information, the base station 50 may select a terminal 82 to be the destination of the warning information based on the location information included in the warning information and the location information of the terminal 82 managed by the base station 50. When the base station 50 receives response information from the terminal 82, the base station 50 may transmit said response information to the vehicle 20 being the sender of the warning information. If the base station 50 has determined that the terminal 82 exists in the unrecognizable area based on the location information included in the warning information and the location information of the terminal 82 managed by the base station 50, the base station 50 may transmit response information to the vehicle 20 being the sender of the warning information. In addition, when the base station 50 receives warning information, the base station 50 may select, as the destination of the warning information, another vehicle 20 existing near the one or more regions included in the warning information based on the location information included in the warning information and the location information of the another vehicle 20 managed by the base station 50. When the base station 50 receives response information from the another vehicle 20 being the destination of the warning information, the base station 50 may transmit said response information to the vehicle 20 being the sender of the warning information. In a case where the system to transmit warning information via the base station 50 is employed, the base station 50 may manage the location of the terminal 82 and the location of the vehicle 20 by periodically collecting the location of the terminal 82 and the location of the vehicle 20.

According to the alerting system 10 described above, warning information can be transmitted with an appropriate alerting level set in accordance with the risk level of each of the plurality of regions in the unrecognizable area. Thus, the terminal 82 can notify the pedestrian 80 at an appropriate level.

Note that the vehicle 20 is one example of transportation equipment. The transportation equipment includes an automobile such as a passenger vehicle or a bus, a saddle-ride type vehicle, a bicycle, and the like. In addition, the moving object includes not only a person but also transportation equipment, for example, an automobile such as a passenger vehicle or a bus, a saddle-ride type vehicle, and a bicycle.

FIG. 7 shows an example of a computer 2000 where a plurality of embodiments of the present invention may be entirely or partially embodied. The program installed on the computer 2000 can cause the computer 2000 to function as a apparatus such as the control apparatus 24 according to the embodiment or each unit of said apparatus, execute an operation associated with said apparatus or each unit of said apparatus, and/or execute a process according to the embodiment or steps of said process. Such a program may be executed by a CPU 2012 in order to cause the computer 2000 to execute a specific operation associated with some or all of the blocks in the processing sequences and the block diagram described herein.

The computer 2000 according to the present embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates in accordance with the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on the hardware of the computer 2000. The input/output chip 2040 may also connect, to the input/output controller 2020, various input/output units such as a keyboard, a mouse, and a monitor, via input/output ports such as a serial port, a parallel port, a keyboard port, a mouse port, a monitor port, a USB port, and HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014 or the ROM 2026 and executed by the CPU 2012. The information processing written in these programs is read into the computer 2000, which provides cooperation between a program and the above-described various types of hardware resources. An apparatus or a method may be constituted by implementing operations or processing of information in accordance with the usage of the computer 2000.

For example, when communication is executed between the computer 2000 and an external device, the CPU 2012 may execute a communication program loaded onto the RAM 2014 to instruct communication processing to the communication interface 2022, based on the processing written in the communication program. Under control of the CPU 2012, the communication interface 2022 reads transmission data stored on transmission buffering regions provided in recording media such as the RAM 2014 and the flash memory 2024, and transmits the read transmission data to a network or writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, condition judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among said plurality of entries, and read the attribute value of the second attribute stored in said entry, thereby acquiring the attribute value of the second attribute associated with the first attribute satisfying the predetermined condition.

The program or software module described above may be stored on the computer 2000 or in a computer-readable medium near the computer 2000. The recording medium such as a hard disk or RAM provided in a server system connected to a dedicated communication network or the internet is available as a computer-readable medium. The program stored in the computer-readable medium may be provided to the computer 2000 via the network.

The program installed in the computer 2000 and causing the computer 2000 to function as the control unit 200 may work on the CPU 2012 and the like to cause the computer 2000 to each function as each unit of the control unit 200. When the information processing written in these programs is read by the computer 2000, the information processing written in the program function as each unit of the control unit 200, which is a specific means in which software and the various types of hardware resources described above cooperate. A control unit 200 suitable for an intended use is constructed by these specific means implementing operations or processing of information appropriate for the intended use of the computer 2000 in the present embodiment.

Various embodiments have been described with reference to the block diagram and the like. In the block diagram, each block may represent (1) a step of a process in which an operation is executed, or (2) each unit of the apparatus having a role of executing the operation. Specific steps and each unit may be implemented by a dedicated circuit, a programmable circuit provided along with a computer-readable instruction stored on a computer-readable medium, and/or a processor provided along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit, including, e.g., logic operations such as logic AND, logic OR, logic XOR, logic NAND, logic NOR, and other logical operations, as well as memory elements such as a flip-flop, a register, a field programmable gate array (FPGA), a programmable logic array (PLA), and the like.

The computer-readable medium may include any tangible device capable of storing an instruction executed by an appropriate device, so that the computer-readable medium having the instruction stored thereon constitutes at least a part of a product including the instruction that may be executed in order to provide a means for executing an operation specified by a processing sequence or a block diagram. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, and the like.

The computer-readable instruction may include any of: an assembler instruction, an instruction-set-architecture (ISA) instruction; a machine instruction; a machine-dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing sequence or the block diagram. Examples of the processors include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: alerting system
20: vehicle
21: radar
22: camera
24: control apparatus
25: GNSS receiving unit
26: vehicle speed sensor
29: sensor
30: drive assistance control apparatus
40: information output apparatus
48: communication apparatus
50: base station
70, 72: roadway
80: pedestrian
82: terminal
80: pedestrian
90: building
300: area 310: first region
320: second region
301, 302, 303, 304, 305, 306, 307, 308: point
200: control unit
208: vehicle control unit
210: image acquiring unit
220: area identification unit
222: arrival time calculation unit
224: region setting unit
226: alerting level setting unit
250: transmission control unit
260: reception control unit
280: storage unit
2000: computer
2010: host controller
2012: CPU
2014: RAM
2020: input/output controller
2022: communication interface
2024: flash memory
2026: ROM
2040: input/output chip

What is claimed is:

1. A control apparatus comprising:
at least one processor, wherein the at least one processor:
identifies an unrecognizable area not possible to be recognized from a moving object;
calculates an arrival time taken by the moving object to arrive at a location in the identified unrecognizable area;
sets a first region and a second region in the identified unrecognizable area based on the arrival time;
sets an alerting level for the first region and an alerting level for the second region different from each other;
controls transmitting warning information to an external apparatus, the warning information including: location information of the first region and location information of the second region; and information indicating the alerting level set for the first region and the alerting level set for the second region; and
controls the moving object based on response information received from the external apparatus in response to the warning information.

2. The control apparatus according to claim 1, wherein the at least one processor further:
sets the first region and the second region if the identified unrecognizable area exceeds a predetermined size, and
sets a uniform alerting level for the unrecognizable area if the first region and the second region have not been set.

3. The control apparatus according to claim 2, wherein the at least one processor further sets the alerting level for the first region and the alerting level for the second region different from each other based on an arrival time taken by the moving object to arrive at the first region and an arrival time taken by the moving object to arrive at the second region.

4. The control apparatus according to claim 2, wherein the at least one processor further:
acquires an image captured by an image capturing unit installed in the moving object, and
identifies the unrecognizable area based on the image.

5. The control apparatus according to claim 2, wherein the at least one processor further:
controls reception of location information of the unrecognizable area from the external apparatus, and
identifies an area not possible to be recognized from a location of the moving object based on the location information received from the external apparatus.

6. The control apparatus according to claim 1, wherein the at least one processor further sets the alerting level for the first region and the alerting level for the second region different from each other based on an arrival time taken by the moving object to arrive at the first region and an arrival time taken by the moving object to arrive at the second region.

7. The control apparatus according to claim 1, wherein the at least one processor further controls transmitting the warning information without designating a destination.

8. The control apparatus according to claim 1, wherein the at least one processor further:
acquires an image captured by an image capturing unit installed in the moving object, and
identifies the unrecognizable area based on the image.

9. The control apparatus according to claim 1, wherein the at least one processor further:
controls reception of location information of the unrecognizable area from the external apparatus, and
identifies an area not possible to be recognized from a location of the moving object based on the location information received from the external apparatus.

10. The control apparatus according to claim 9, wherein the external apparatus is a server or another moving object configured to collect location information of the unrecognizable area.

11. The control apparatus according to claim 1, wherein the at least one processor further controls reception of the response information from the external apparatus.

12. The control apparatus according to claim 11, wherein the at least one processor further controls execution of driving assistance of the moving object or warning to an occupant of the moving object.

13. The control apparatus according to claim 11, wherein the at least one processor further controls the reception of the response information indicating that there exists a warning target in at least one of the first region or the second region.

14. The control apparatus according to claim 11, wherein the at least one processor further controls the reception of the response information from another moving object existing outside the unrecognizable area.

15. The control apparatus according to claim 11, wherein the at least one processor further controls the reception of the response information from another moving object existing in the unrecognizable area.

16. The control apparatus according to claim 1, wherein the location information of the first region includes coordinate information of the first region, and the location information of the second region includes coordinate information of the second region.

17. The control apparatus according to claim 1, wherein the moving object is a vehicle.

18. A moving object comprising the control apparatus according to claim 1.

19. A control method comprising:
identifying an unrecognizable area not possible to be recognized from a moving object;
calculating an arrival time taken by the moving object to arrive at a location in the identified unrecognizable area;
setting a first region and a second region in the identified unrecognizable area based on the arrival time;
setting an alerting level for the first region and an alerting level for the second region different from each other;

controlling transmitting warning information to an external apparatus, the warning information including: location information of the first region and location information of the second region; and information indicating the alerting level set for the first region and the alerting level set for the second region; and controlling the moving object based on response information received from the external apparatus in response to the warning information.

20. A non-transitory computer-readable storage medium having recorded thereon a program, when executed by a computer, for causing the computer to execute:

identifying an unrecognizable area not possible to be recognized from a moving object;

calculating an arrival time taken by the moving object to arrive at a location in the identified unrecognizable area;

setting a first region and a second region in the identified unrecognizable area based on the arrival time;

setting an alerting level for the first region and an alerting level for the second region different from each other;

controlling transmitting warning information to an external apparatus, the warning information including: location information of the first region and location information of the second region; and information indicating the alerting level set for the first region and the alerting level set for the second region; and controlling the moving object based on response information received from the external apparatus in response to the warning information.

* * * * *